(12) United States Patent
Bourgeois

(10) Patent No.: US 6,913,725 B1
(45) Date of Patent: Jul. 5, 2005

(54) PLASTIC CLOSURE WITH COMPRESSION MOLDED LAYERED BARRIER LINER

(75) Inventor: Philip D. Bourgeois, Perrysburg, OH (US)

(73) Assignee: Owens-Illinois Closure Inc., Toledo, OH (US)

(*) Notice: Subject to any disclaimer, the term of this patent is extended or adjusted under 35 U.S.C. 154(b) by 129 days.

(21) Appl. No.: 10/646,481

(22) Filed: Aug. 22, 2003

Related U.S. Application Data

(62) Division of application No. 09/676,002, filed on Sep. 29, 2000, now Pat. No. 6,660,349.

(51) Int. Cl.[7] .............................................. B29C 45/14
(52) U.S. Cl. ..................... 264/268; 428/35.7; 428/36.6; 428/66.3; 428/66.4; 428/114; 215/329; 215/341; 215/343; 215/350
(58) Field of Search ........................ 264/268; 428/35.7, 428/36.6, 66.3, 66.4, 114; 215/350, 341, 343, 329; 220/240, 288, 327, 378

(56) References Cited

U.S. PATENT DOCUMENTS

| | | | |
|---|---|---|---|
| 4,497,765 A | 2/1985 | Wilde et al. | 264/268 |
| 4,721,221 A | 1/1988 | Barriac | 215/350 |
| 4,984,703 A | 1/1991 | Burzynski | 215/350 |
| 5,050,753 A | 9/1991 | Trump et al. | 215/252 |
| 5,064,084 A | 11/1991 | McBride et al. | 215/350 |
| 5,186,991 A | 2/1993 | Samuel et al. | 428/35.8 |
| 5,306,542 A | 4/1994 | Bayer | 428/192 |
| 5,605,996 A | 2/1997 | Chuu et al. | 526/340 |
| 5,700,412 A | 12/1997 | Mehra et al. | 264/143 |
| 5,806,707 A | 9/1998 | Boehm et al. | 220/522 |
| 5,924,586 A | 7/1999 | Gregory et al. | 215/350 |
| 6,371,318 B1 | 4/2002 | Riffer | 215/347 |
| 6,399,170 B1 | 6/2002 | Hock et al. | 428/36.6 |

FOREIGN PATENT DOCUMENTS

EP 0926078 6/1999

OTHER PUBLICATIONS

Kamal, M.R., H. Garmabi, S. Hozhabr and L. Arghyris "The Development of Laminar Morphology D ring Extrusion of Polymer Blends," Polymer Engineering and Science, vol. 35, No. 1; Jan. 1995.

*Primary Examiner*—Michael P. Colaianni
*Assistant Examiner*—David Beck

(57) ABSTRACT

A plastic closure includes a closure shell having a base wall, a peripheral skirt with an internal thread for securing the closure to a container finish, and an annular lip extending from the closure skirt adjacent to the base wall and defining an inside lip surface at an acute angle to the closure base wall. A liner is compression molded in situ onto the base wall and peripherally within the lip. The liner has a liner base portion extending along the base wall and a peripheral portion extending along the inside surface of the lip. The liner has an interior surface—i.e., facing away from the shell base wall and skirt—that has a first flat axially facing portion on the base portion of the liner adjacent to the peripheral portion, an inwardly concave portion where the base portion blends into the peripheral portion of the liner, a second flat axially facing portion at an edge of the peripheral portion of the liner, and a conical portion that extends from a radially outer edge of the second flat portion to the inside surface of the lip. Provision of the second flat axially facing surface portion at the periphery of the liner has been found to reduce tearing of the liner and separation of layers in the liner when the liner is of layered construction.

8 Claims, 2 Drawing Sheets

PLASTIC CLOSURE WITH COMPRESSION MOLDED LAYERED BARRIER LINER

This application is a division of application Ser. No. 09/676,002 filed Sep. 29, 2000 now U.S. Pat. No. 6,660,349. The present invention is directed to plastic container closures for beverage, food, juice, pharmaceutical and like applications, and more particularly to an improved closure and method of manufacture having a sealing liner with resistance to transmission of gases (such as oxygen and carbon dioxide), water vapor and/or flavorants (flavor scalping).

BACKGROUND AND OBJECTS OF THE INVENTION

It has heretofore been proposed to provide a plastic closure for a container that comprises a plastic cap or shell with an interior liner for sealing engagement with the sealing surface of the container. For example, U.S. Pat. No. 4,984,703 discloses a plastic closure that comprises a shell having a base wall with a peripheral skirt and a thread for securing the closure to a container, and a sealing liner compression molded in situ on the interior of the shell base wall. The sealing liner comprises a blend of ethylene vinyl acetate (EVA) and a thermoplastic elastomer material such as olefin or styrene-butadiene-styrene (SBS). U.S. Pat. 5,451,360 discloses a method and apparatus for compression molding the liner in situ within the closure shell.

Although the closures and methods of manufacture disclosed in the noted patents address problems theretofore extant in the art, further improvements remain desirable. For example, although olefin copolymers such as EVA are sufficiently resilient to provide good sealing against the sealing surface of a container when the closure is fastened to the container, these materials do not provide an acceptable barrier against transmission of gases, such as oxygen and carbon dioxide, that can deleteriously affect the product within the container. It has been proposed to employ a barrier material such as ethylene vinyl alcohol (EVOH) as a gas transmission barrier liner. However, materials of this character tend to be expensive and brittle, and are not well suited to function as a seal.

EP 0926078A1 discloses a plastic closure and method of manufacture in which the liner is compression molded in situ on the interior surface of the closure base wall, and consists essentially of a multiplicity of alternating layers of a matrix polymer and a barrier polymer to resist transmission of gas, water vapor and/or flavorants through the liner and closure. An adhesive material is provided in the liner for adhering the matrix polymer layers to the barrier polymer layers, and for adhering the liner to the closure shell, and is either blended with the matrix material or provided as separate layers between the matrix and barrier polymer layers. EVA and EVOH are preferred matrix and barrier polymers respectively. However, it has been found when implementing the teachings of this disclosure that separation and tearing can occur among the matrix and barrier polymer layers when the closure is threaded onto a container finish.

It is therefore a general object of the present invention, in accordance with one aspect of the invention, to provide a liner for a plastic closure that combines the functions of a seal for engagement with the container sealing surface and an improved barrier against gas transmission, flavor absorption (flavor scalping) and/or water vapor permeation. Another object of the present invention, in accordance with a second aspect of the invention, is to provide a barrier liner that is contoured to resist layer separation and tearing as the closure is applied to a container finish.

SUMMARY OF THE INVENTION

A plastic closure in accordance with one aspect of the present invention includes a closure shell having a base wall, a peripheral skirt with an internal thread or bead for securing the closure to a container finish, and an internal annular lip extending from the shell skirt adjacent to the base wall and defining an inside lip surface at an acute angle to the shell base wall. A liner is compression molded in situ onto the base wall and peripherally within the lip. The liner has a liner base portion extending along the shell base wall and a peripheral portion extending along the inside surface of the lip. The liner has an interior surface—i.e., facing away from the shell base wall and skirt—that has a first flat axially facing portion on the base portion of the liner adjacent to the peripheral portion, an inwardly concave portion where the base portion blends into the peripheral portion of the liner, a second flat axially facing portion at an edge of the concave surface portion of the liner, and a conical portion that extends from a radially outer edge of the second flat portion to the inside surface of the lip. Provision of the second flat axially facing surface portion at the periphery of the liner has been found to reduce tearing of the liner and separation of layers in the liner, when the liner is of layered construction in accordance with a second aspect of the invention, as the closure is threaded onto a container finish.

In accordance with a second aspect of the invention, which preferably is used in combination with but may be implemented separately from other aspects of the invention, the liner is compression molded in situ on the base wall of the closure, and consists essentially of alternating layers of EVA matrix polymer, adhesive polymer and EVOH barrier polymer to resist transmission of gases, water vapor and flavorants through the liner and the closure. The EVA matrix polymer is preferably selected from the group consisting of EVA and EVA blends, specifically a melt blend of EVA and styrene-ethylene-butylene-styrene (SEBS).

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosure of U.S. application Ser. No. 08/998,072, filed Dec. 24, 1997 and assigned to the assignee hereof, is incorporated herein by reference for purposes of background.

Figure 1:
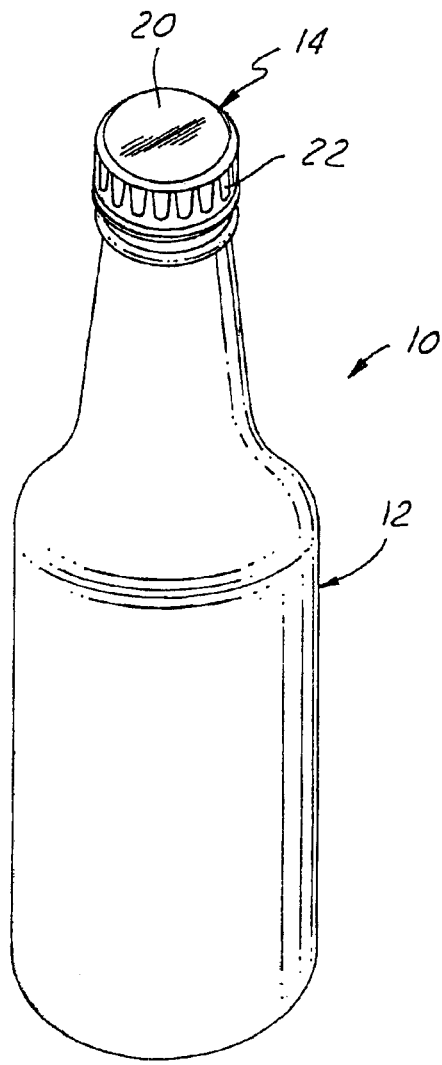
FIG. 1 is a perspective view of a closure and container package in accordance with one presently preferred embodiment of the invention.
Figure 2:
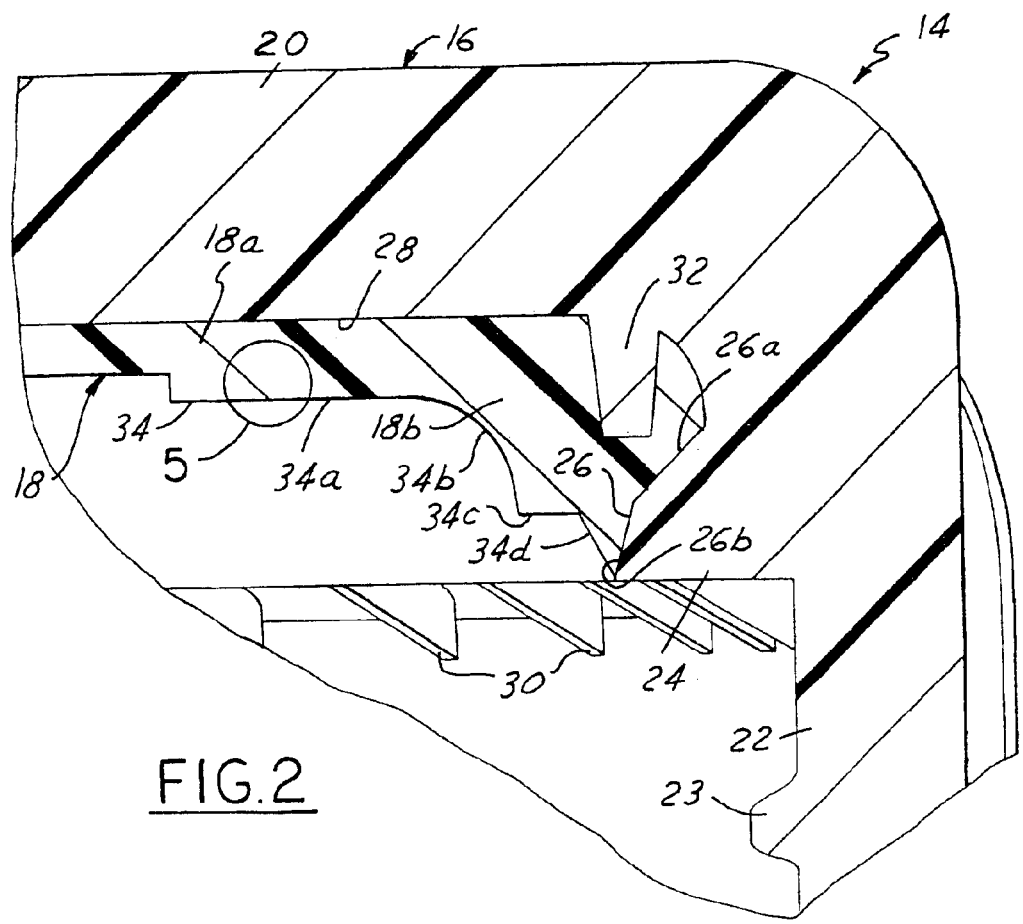
FIG. 2 is a fragmentary sectional view of a plastic closure in accordance with a presently preferred embodiment of the invention.
Figure 4:
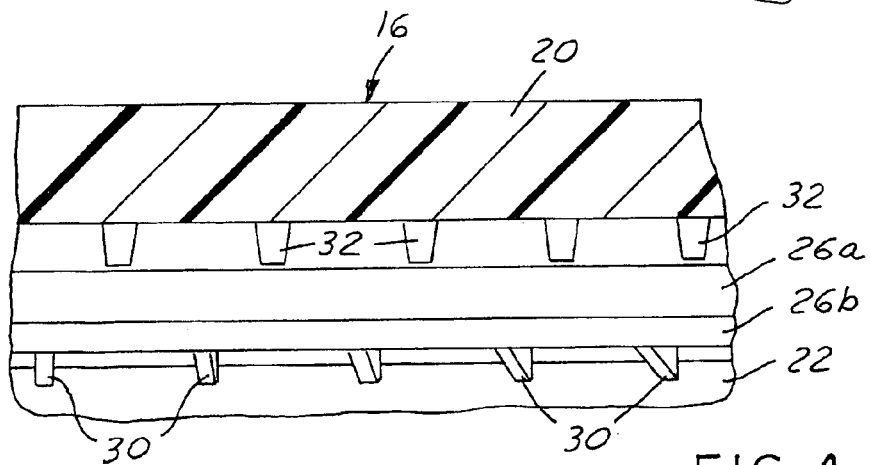
FIG. 4 is a fragmentary sectional view that illustrates the configuration of the plastic closure shell at the internal junction of the shell base wall and peripheral skirt.

FIG. 1 illustrate sa closure and container package 10 as comprising a container 12 of glass or plastic construction and a plastic closure 14 secured to the finish of container 12, preferably by means of one or more internal threads on closure 14 in engagement with one or more external threads on the finish of container 12. FIG. 2 illustrates plastic closure 14 in accordance with one presently preferred embodiment of the invention as comprising a plastic cap or shell 16 and a plastic liner 18 compression molded in situ within shell 16. Shell 16 includes a base wall 20 and a peripheral skirt 22 having one or more internal threads 23 for securing closure 14 to the finish of container 12. A circumferentially continuous annular lip 24 integrally extends radially inwardly from peripheral skirt 22 adjacent to but axially spaced from base wall 20. Lip 24 has an interior surface 26—i.e., facing the opposing interior surface 28 of base wall 20—disposed at an acute angle to base wall 20. Specifically, surface 26 includes a first conical surface portion 26a adjacent to skirt 22 at a first acute angle to base wall surface 28, and a second conical surface portion 26b extending from surface portion 26a at a second acute angle to base wall surface 28. In the preferred embodiment of the invention illustrated in FIG. 2, surface portion 26a is at an angle of 45° to the central axis of closure shell 16, and surface portion 26b is at an angle of 10° to the shell axis. A circumferential array of angulated ribs or gussets 30 (FIGS. 2 and 4) extend from the lower edge of lip 24 to the adjacent interior surface of skirt 22 for strengthening lip 24 against axial and radial displacement. A circumferential array of frustoconical nibs 32 extend axially from base wall 20 adjacent to skirt 22 for embedment within liner 18 and thereby helping to prevent separation of the liner from the closure shell.

Liner 18 is of plastic construction and is compression molded in situ within closure shell 16. Lip 24 functions as a peripheral wall to confine liner 18 within the closure shell during the molding operation. Liner 18 includes a base portion 18a that extends along surface 28 of shell base wall 20, and an axially enlarged peripheral portion 18b extending along lip surface 26. Liner 18 has an interior surface 34 that faces away from shell base wall 20 and peripheral skirt 22. Surface 34 includes a first flat axially facing surface portion 34a on liner base portion 18a perpendicular to the axis of shell 16 and disposed adjacent to the peripheral portion 18b of liner 18. From surface portion 34a, surface 34 includes an annular inwardly concave surface portion 34b where base portion 18a blends into peripheral portion 18b. Surface portion 34b extends entirely around liner 18 and preferably has a constant radius of curvature. A second flat axially facing surface portion 34c is perpendicular to the shell axis and extends radially outwardly from an edge of surface portion 34b. A frustoconical surface portion 34d extends angularly outwardly from the radially outer edge of surface portion 34c to the opposing portion 26b of lip surface 26. Surface portion 34d is at an angle of 30° to the closure shell axis in the preferred embodiment of the invention. All surface portions 34a, 34b, 34c and 34d are circumferentially continuous.

Figure 3:
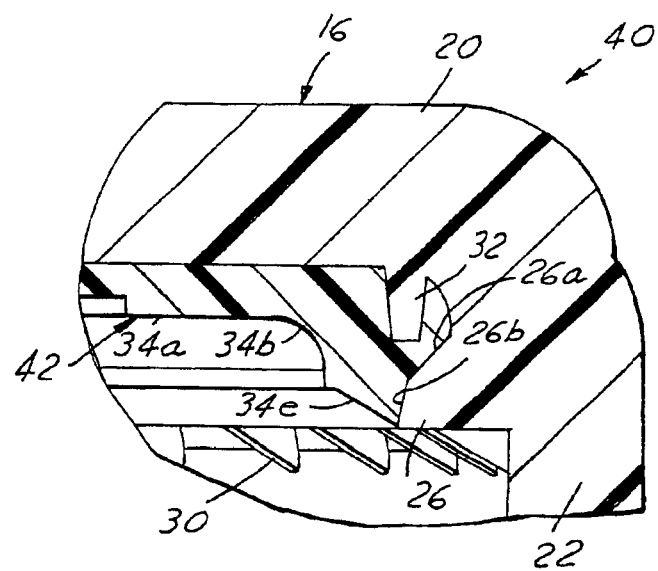
FIG. 3 is a fragmentary perspective view similar to that of FIG. 2 but illustrating a differing liner configuration.

FIG. 3 illustrates a plastic closure 40 with liner 42 that is similar to closure 14 in FIG. 2, but in which liner surface portions 34c, 34d in FIG. 2 are replaced by a frustoconical surface portion 34e at an angle of 60° to the closure axis. Liner surface portion 34e in FIG. 3 extends from the outer edge of surface portion 34b surface 26b of lip 26. When employing the preferred layered liner constructions as will be described, it has been found that provision of the stepped configuration of surface portions 34c and 34d in FIG. 2 in place of the frustoconical surface portion 34e in FIG. 3 helps reduce tearing of the liner by separation of the liner layers as the closure is threaded onto a container finish and the liner edge engages the sealing surface of the container.

Figure 5:
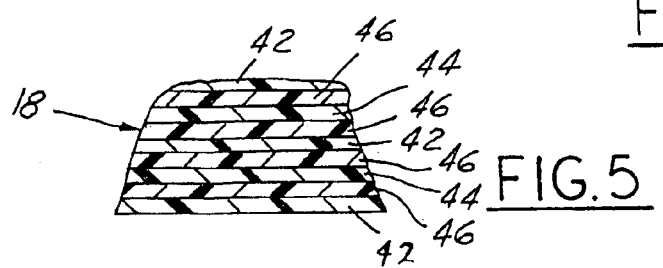
FIG. 5 is a fragmentary sectional view on an enlarged scale of the portion of FIG. 2 within the circle 5.

The presently preferred construction of liner 18 illustrated in FIG. 2 and liner 42 in FIG. 3 comprise, and preferably consist essentially of, a multiplicity of layers 42 (FIG. 5) of matrix polymer alternating with a multiplicity of layers 44 of barrier polymer, with a layer 46 of adhesive polymer disposed between successive layers 42, 44 of matrix and barrier polymers. These multiple layers 42, 44, 46 preferably are formed in a coextrusion/layer generation/layer multiplication operation to form charges of liner material, which are then compression molded in situ within preformed closure shells, as disclosed in above-referenced U.S. application Ser. No. 08/998,072. In accordance with preferred embodiments of the present invention, the liner 18 consists essentially of a multiplicity of alternating layers (e.g., 257 alternating layers) of an EVA matrix polymer 42, an adhesive polymer 46 and an EVOH barrier polymer 44. The EVA matrix polymer is either EVA or an EVA blend, such as a melt blend of EVA and SEBS. In one presently preferred embodiment of the invention, the matrix polymer is an EVA matrix polymer in the amount of 75 to 90 wt percent. In this embodiment, the EVOH barrier polymer is in the amount of 7 to 20 wt percent, and a maleic anhydride-grafted EVA adhesive is in the amount of 3 to 5 wt percent. In accordance with another preferred embodiment of the invention, the matrix material may comprise a melt blend of EVA with another polymer such as SEBS. In the overall liner, the matrix polymer is preferably in the range of 75 to 85 wt percent, most preferably consisting essentially of 75 wt percent EVA and 25 wt percent SEBS. The adhesive in such embodiment preferably is a maleic anhydride-modified polypropylene (PP) in the amount of 3 to 10 wt percent, and the barrier material preferably consists of EVOH in the amount of 5 to 20 wt percent.

There have thus been disclosed a plastic closure and method of manufacture that fully satisfy all of the objects and aims previously set forth. A number of modifications and variations have been disclosed. Other modifications and variations will readily suggest themselves to persons of ordinary skill in the art. For example, the EVOH barrier polymer in accordance with the present invention can be blended with talc, nanocomposite clay such as smectite, or liquid crystal polymer to enhance the barrier properties of the EVOH polymer, all without departing from the scope of the present invention. Lubricant may be blended with the matrix barrier polymer to reduce closure removal torque, again without departing from the disclosure of the present invention. The invention is intended to embrace all such modifications and variations as fall within the spirit and broad scope of the appended claims.

What is claimed is:

1. A method of making a plastic closure that comprises the steps of:

(a) providing a closure shell having a base wall, a peripheral skirt, means on said skirt for securing the closure to a container, and an annular lip extending from said skirt adjacent to said base wall and defining an inside lip surface at an acute angle to said base wall, and (b) compression molding a liner in situ onto said base wall and peripherally within said lip such that said liner has a liner base portion extending along said base wall and a peripheral portion extending along said lip surface, said step (b) being such that said liner as molded has an interior surface that has a first flat axially facing surface portion on said base portion adjacent to said peripheral portion, an inwardly concave surface portion where said base portion blends into said peripheral portion, a second flat axially facing surface portion at an axial edge of said concave surface portion, and a conical surface portion that extends from a radially outer edge of said second flat surface portion to said inside surface of said lip.

2. The method set forth in claim 1 wherein said liner consists essentially of alternating layers of matrix polymer, adhesive polymer and barrier polymer resistant to permeation of gases through said liner.

3. The method set forth in claim 2 wherein said matrix polymer consists essentially of EVA, said barrier polymer consists essentially of EVOH, and said adhesive polymer is selected from the group consisting of maleic-anhydride-modified EVA and maleic-anhydride-modified PP.

4. The method set forth in claim 1 wherein said matrix polymer comprises an EVA polymer and said barrier polymer comprises EVOH.

5. The method set forth in claim 1 wherein said matrix polymer consists essentially of a melt blend of EVA and SEBS, said barrier polymer consists essentially of EVOH, and said adhesive polymer is selected from the group consisting of maleic-anhydride-modified EVA and maleic-anhydride-modified PP.

6. The method set forth in claim 1 wherein said step (b) is such that said conical surface portion is at an angle of 30° to a central axis of said shell.

7. The method set forth in claim 1 wherein said step (a) is such that said shell further includes a circumferential array of nibs extending from said base wall adjacent to said skirt and embedded in said peripheral portion of said liner following said step (b).

8. The method set forth in claim 7 wherein said step (a) is such that said shell further includes a circumferential array of gussets extending from said lip to an inside surface of said skirt.

* * * * *